A. BOUCHERY.
DISH WASHING APPARATUS.
APPLICATION FILED JULY 13, 1914.
1,143,099.
Patented June 15, 1915.
2 SHEETS—SHEET 1.
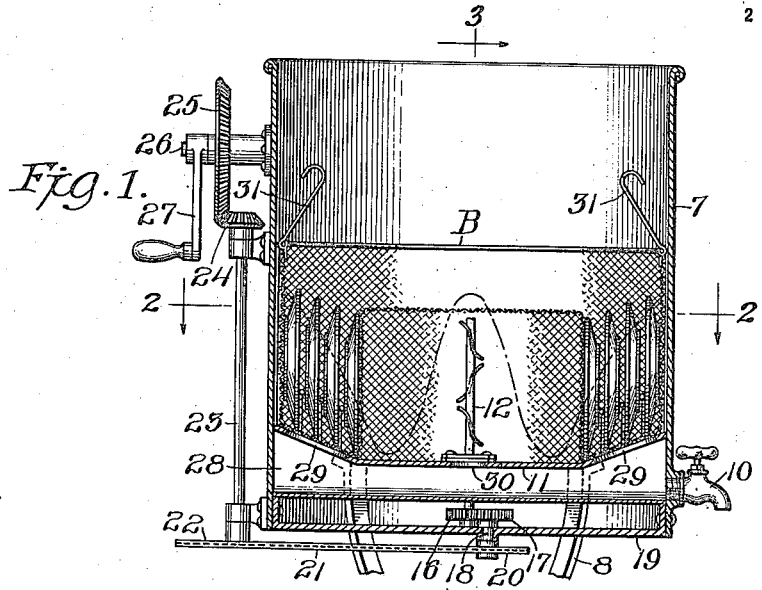
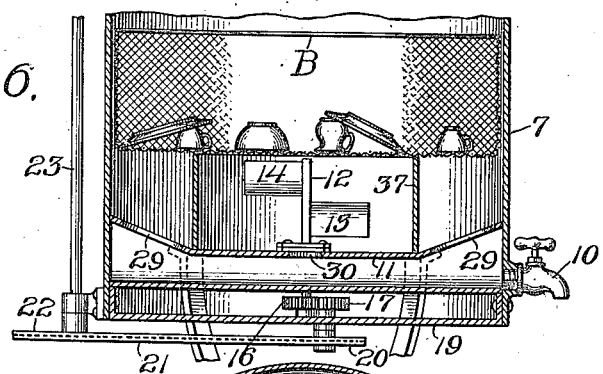
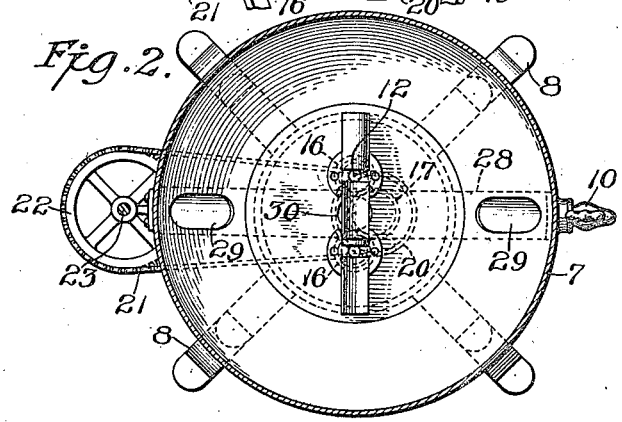
Witnesses:
A. R. Appleman
W. H. Hawkins
Inventor:
AUGUST BOUCHERY,
By his Attorney John O. Seifert

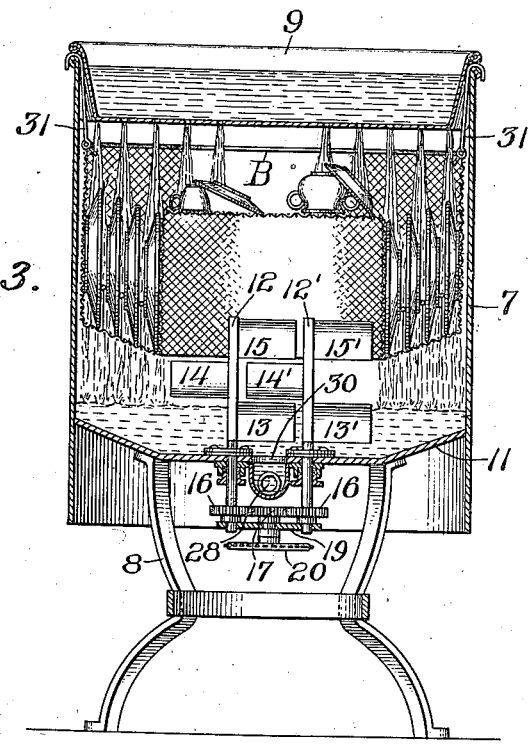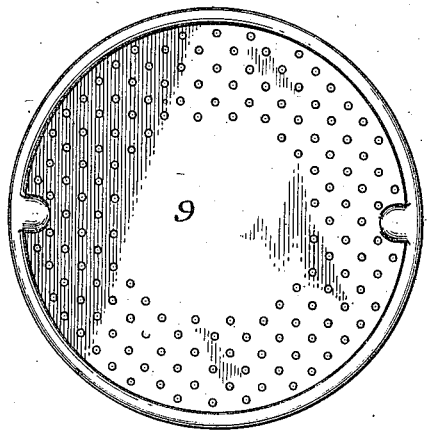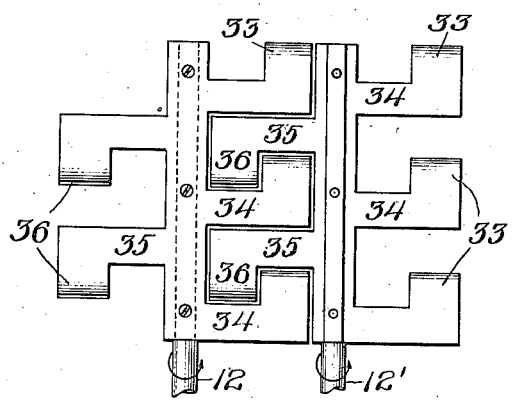

UNITED STATES PATENT OFFICE.

AUGUST BOUCHERY, OF NEW YORK, N. Y., ASSIGNOR, BY MESNE ASSIGNMENTS, TO CLARENCE K. McCORNICK, OF NEW YORK, N. Y.

DISH-WASHING APPARATUS.

1,143,099.  Specification of Letters Patent.  Patented June 15, 1915.

Application filed July 13, 1914. Serial No. 850,623.

*To all whom it may concern:*

Be it known that I, AUGUST BOUCHERY, a citizen of the United States, residing in the borough of Brooklyn, in the county of Kings, city and State of New York, have invented new and useful Improvements in Dish-Washing Apparatus, of which the following is a specification.

This invention relates to portable dish washing apparatus in which the dishes are carried by a wire basket or rack in a water containing receptacle and the water agitated in the receptacle to wash the dishes, and it is the object of the invention to provide improved means to agitate the water and to provide a dish washing apparatus which is simple and cheap in construction, and efficient and easy in operation.

Dish washing apparatus of this character as heretofore constructed has been impractical due to the fact that to efficiently wash the dishes a large quantity of water is required, and it is an object of the invention to provide a dish washing apparatus in which a minimum amount of water is required, or not more than is ordinarily required to wash dishes by hand.

Further objects of the invention relate to an improved dish carrying basket or rack to extend around the sides and top of the water agitating means, said basket having means to suspend the same from the top of the receptacle, and to provide a dished articulated cover for the basket to permit water to percolate over the dishes to rinse the same.

In the drawings accompanying and forming a part of this specification, Figure 1 is a sectional side elevation of a dish washing apparatus illustrating an embodiment of my invention, and illustrating the dish carrying rack in position when washing dishes. Fig. 2 is a sectional plan view of the apparatus taken substantially on the line 2—2 of Fig. 1. Fig. 3 is a cross sectional view taken substantially on the line 3 of Fig. 1, showing the dish carrying basket suspended from the top of the receptacle and the dished articulated cover applied thereto to rinse the dishes. Fig. 4 is a plan view of the articulated dished cover for the basket. Fig. 5 is a side elevation showing a modified form of water agitating blades; and Fig. 6 is a sectional side of the apparatus showing a modification of the water agitating means.

Similar characters of reference designate like parts throughout the different views of the drawings.

In the embodiment of my invention shown in the drawings, a water containing receptacle 7 open at the top and having a suitable cover 9 is supported on legs 8, a cock being provided to drain the water from the receptacle. The sides of the receptacle preferably extend somewhat below the bottom, as clearly shown in Figs. 1 and 3, and the bottom is inclined or curved downwardly from the sides as shown at 11, whereby the water centrally of the receptacle will be of greater depth than adjacent the sides.

A pair of shafts 12, 12' are mounted in the bottom to rotate on vertical axes, the shafts projecting through the bottom and suitable stuffing boxes being provided to prevent leakage. Each of the shafts has a laterally projecting blade 13, 13' adjacent the bottom and inclined to the axis of its shaft, a second blade 14, 14' being connected to the shafts above the first blade to extend substantially diametrically opposite thereto and inclined at an angle to the axes of the shafts reverse to the inclination of the first blades, and a third blade 15, 15' connected to the shafts above the second blade to project diametrically opposite to the second blade and in line with the first blade, and said blades being inclined to the axes of the shafts in a direction corresponding substantially to the inclination of the first blades. These blades are constructed substantially as shown in Figs. 3 and 6 with the blades on one shaft at heights corresponding to the height of every blade on the other shaft so that as the shafts are rotated the blades of one shaft will intersect the orbit of movement of the blades on the other shaft and due to the reverse inclination of successive blades they will lift the water and then deflect such lifted water from the top of the blades.

Pinions 16 are fixed to the ends of the shafts below the bottom of the receptacle and with which pinions a gear 17 meshes, said gear being fixed to a stud shaft 18 journaled in a member 19 fixed at its ends to the projecting sides of the receptacle, or if desired this member 19 may be in the form of a housing to inclose the pinions 16 and gear 17. The said shaft 18 extends through the member 19 and has a sprocket wheel 20 fixed thereto, a chain 21 operatively connecting said sprocket wheel with a sprocket wheel 22 fixed to the lower end of a shaft 23 rotatably supported in brackets fixed to the side of the receptacle. A bevel pinion 24 fixed to the upper end of said shaft meshes with a bevel gear 25 rotatably mounted on a stud shaft 26 and to which gear a crank 27 is connected. The shafts 12, 12' are rotated in the same direction and are so located that the orbit of movement of the blades of one shaft intersect the orbit of movement of the blades of the other shaft.

As the blades are rotated there is a tendency of the water being thrown outward through the action of centrifugal force and during the continued rotation of the blades there would be no water centrally of the receptacle and adjacent the blades to be lifted and thrown laterally. Therefore, in order to have a sufficient supply of water centrally of the receptacle and adjacent the blades, I provide means to lead or draw the water from the sides of the receptacle to a point adjacent the axis of rotation and below the blades. For this purpose I provide a duct or ducts 28 below the bottom of the receptacle having an opening or openings 29, in the present instance shown as two in number, in the bottom adjacent the sides of the receptacle, and an opening 30 between the shafts 12, 12'. It will be obvious that as the water is thrown out from the center through the action of centrifugal force the water will gravitate down through the openings 29 and up through the opening 30 from whence it is lifted by the blades. Furthermore, the rotation of the blades 13, 13' co-operating with the opening 30 sets up a sucking action facilitating the flow of the water.

For the purpose of supporting the dishes in the receptacle so as not to interfere with the operation of the blades and the consequent breaking of the dishes, I provide a suitable dish carrying basket or rack, designated in a general way by B, consisting of a framework with a wire mesh, said basket being adapted to rest upon the bottom of the receptacle and so constructed as to extend around the sides and top of the water lifting and agitating blades and thereby permit of the distributing of the dishes to be washed around the sides and top of the blades, as clearly shown in Fig. 1.

In the operation of the apparatus shown in Figs. 1 to 3 the receptacle is filled with water to substantially the height indicated in Fig. 3, with the blades 13, 13' nearly submerged in the water, the basket with the dishes resting upon the bottom of the receptacle. The blades are then rotated by the crank. At the commencement of the rotation of the blades the blades 13, 13' as they are rotated lift the water deflecting portions thereof upwardly and laterally, the blades 14, 14' still further deflecting the water lifted by the lower blades upward and splashing a portion of the water laterally, the water deflected upward by said latter blades being splashed upwardly and laterally by the upper blades 15, 15'. The continued rotation of the blades tends to throw the water to the sides of the receptacle through the action of centrifugal force. However, due to the provision of the duct or ducts 28 having the openings 29 adjacent the sides through which the water gravitates and up through the central opening 30 below the blades 13, 13' there is a constant supply of water centrally of the receptacle and adjacent the blades. The lower blades not only lift the water entering through the opening 30 but also set up a sucking action drawing the water through the channels 28 from the sides of the receptacle. It will be obvious that there will be a continuous supply or flow of water to the blades and that the blades not only agitate but set up a violent splashing of the water. After the water has been agitated sufficiently to wash the dishes, the basket with the dishes is lifted out of the washing water and suspended from the top of the receptacle by hooks 21 connected to the basket. In this position of the basket the cover 9, which is in the nature of a pan having a series of articulations or openings in the bottom, is set into and supported by the top of the receptacle, and as clean water is poured into said pan it will percolate through the openings and over the dishes thoroughly rinsing the same. After the dishes have been rinsed the basket with the dishes is lifted from the receptacle when the operation may be repeated. The inclining of the bottom as shown at 11 not only increases the depth of the water centrally of the receptacle, but by so constructing the receptacle a less quantity of water is required for the washing operation. After the dishes have been washed and rinsed the water is drawn from the receptacle by opening the cock 10.

In Fig. 5 I have shown the shafts 12, 12' provided with a modified form of blades. These blades are constructed substantially similar to the blades in Figs. 1 and 2, except that there are three superposed blades 34 projecting laterally from each shaft and each of said blades has an upwardly extending portion 33 adjacent the ends forming an angular recess in the blades adjacent the shafts, and two superposed blades 35 project diametrically opposite to the blades 34, each of which blades has a downward extending portion 36 forming an angular recess adjacent the shafts. The blades of one shaft also intersect the orbit of movement of the blades of the other shaft, the same as in Figs. 1 to 3, the extending portions 36 of the blades 35 passing through the recesses formed by the projections 33 on the blades 34, and the extensions 33 on the blades 34 passing through the recesses formed by the extensions 36 on the blades 35.

In the construction illustrated in Fig. 7 each of the shafts 12, 12' is provided with the blades 13, 13' and 14, 14' and the blades are inclosed by a tubular member or housing 37 extending the length of the shafts and open at the top, the receptacle in washing the dishes being filled to substantially the height of said housing, the dish carrying basket B resting upon said housing as clearly shown in said Fig. 7. The duct 28 having the openings 29 and 30 is also provided. In the operation of washing the dishes as the blades are rotated the water contained within the housing will be driven upwardly and laterally and be displaced by water adjacent the sides of the receptacle entering the duct through the openings 29 and passing up through the opening 30.

Having thus described my invention, I claim:

1. A dish washing apparatus comprising in combination a receptacle to contain water and the dishes; a pair of shafts in said receptacle rotatable on vertical axes; and a series of superposed blades on each shaft to extend from one side of the shaft and inclined to the axis of the shaft with the lower blade of each shaft contiguous to the bottom of the receptacle, said blades so arranged that adjacent blades will extend in diametrically opposite directions from the shaft and inclined in a reverse direction relative to each other, and the blades on one shaft being at heights corresponding to the height of every blade on the other shaft, substantially as and for the purpose specified.

2. A dish washing apparatus comprising in combination a receptacle to contain water and the dishes; a pair of shafts in said receptacle rotatable on vertical axes; blades on each shaft, the blades being so arranged that the orbit of movement of the blades on one shaft will intersect the orbit of movement of the blades on the other shaft; and ducts having openings adjacent the sides of the receptacle and an opening common to all the ducts in the bottom of the receptacle at a point between the two shafts and in the orbit of movement of the blades on both shafts, substantially as and for the purpose specified.

3. A dish washing apparatus comprising in combination a receptacle to contain water and the dishes, the bottom of the receptacle inclining downward from the sides toward the center; a pair of shafts in said receptacle rotatable on vertical axes; a series of superposed blades on each shaft, each blade to extend laterally from one side of the shaft only and inclined to the axis of the shaft, and the blades being staggered so that succeeding blades will extend from the shaft in a direction diametrically opposite to the next adjacent blade and be inclined in a reverse direction, so that each shaft has blades at heights corresponding to the height of every blade on the other shaft, and the shafts so arranged that the orbit of movement of the blades on one shaft will intersect the orbit of movement of the blades on the other shaft and the blades on one shaft will pass the blades of the other shaft, substantially as and for the purpose specified.

4. A dish washing apparatus comprising in combination a receptacle to contain water and carry the dishes; and a pair of shafts in said receptacle rotatable on vertical axes, each shaft having a blade at the same height adjacent the bottom of the receptacle extending laterally from one side of the shaft only and inclined to the axis of the shaft, a second blade on each shaft at the same height above the first blade and extending from one side of the shaft only and diametrically opposite to the first blade and inclined in a direction reverse to the inclination of the first blade, and a third blade on each shaft at the same height above the second blade extending from one side of the shaft only and diametrically opposite to the second blade and in line with the first blade and inclined reverse to the inclination of the second blade, substantially as and for the purpose specified.

5. In a dish washing apparatus, the combination with a receptacle to contain water and carry the dishes, of a pair of rotatable shafts in the receptacle; superposed blades on said shafts, the blades on one shaft being at heights corresponding to the height of every blade on the other shaft, and the blades of one shaft intersecting the orbit of movement of the blades on the other shaft; and a duct having openings in the receptacle adjacent the sides and an opening in the bottom of the receptacle midway between the shafts, substantially as and for the purpose specified.

AUGUST BOUCHERY.

Witnesses:
PAULA PHILIPP,
JOHN O. SEIFERT.